June 23, 1953  J. E. OSBORNE  2,642,909
POTATO PLANTER
Filed July 3, 1950 2 Sheets-Sheet 1
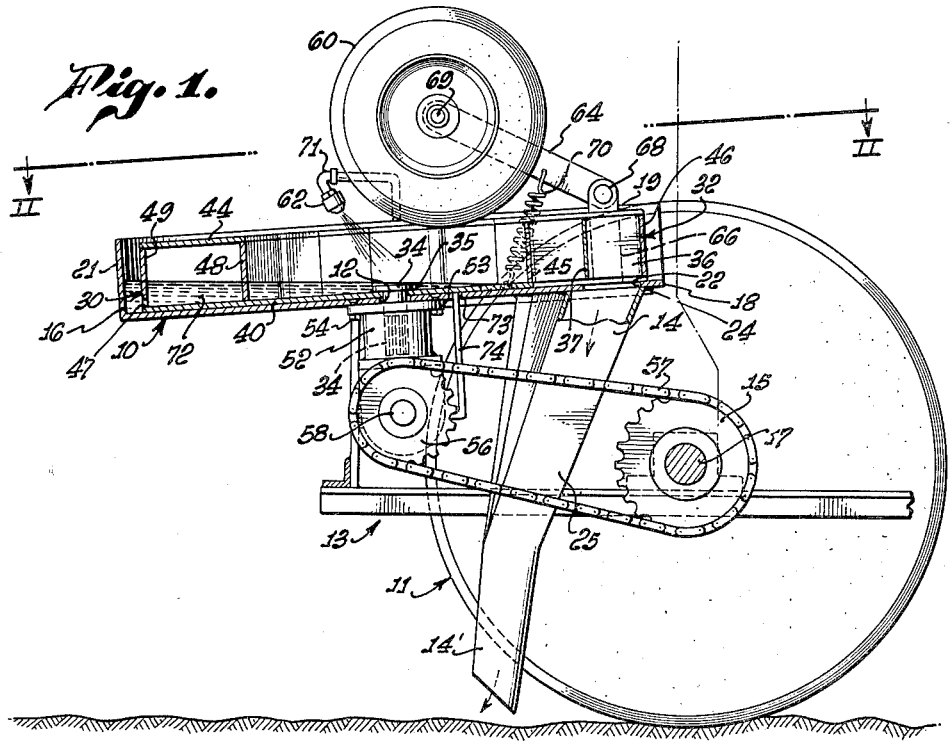
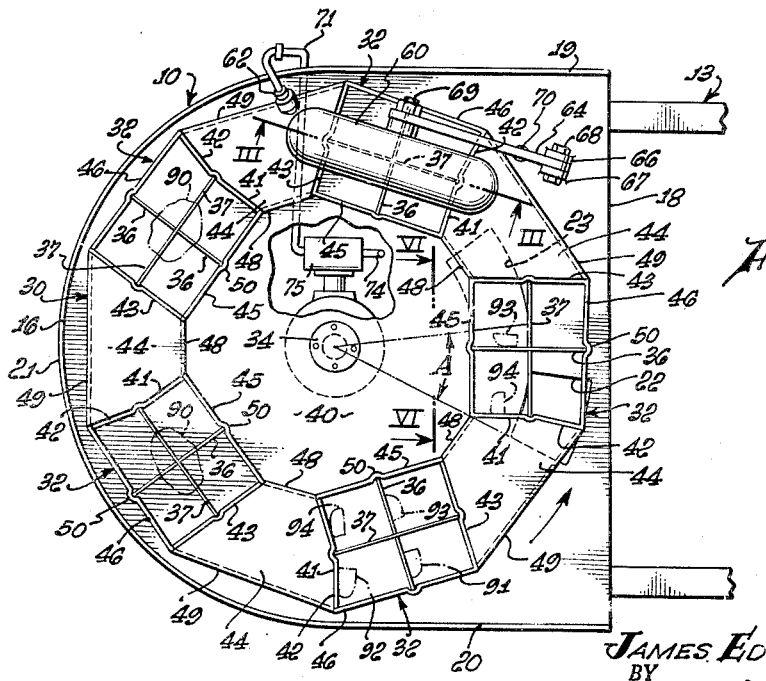
INVENTOR.
JAMES EDGAR OSBORNE,
BY
ATTORNEY.

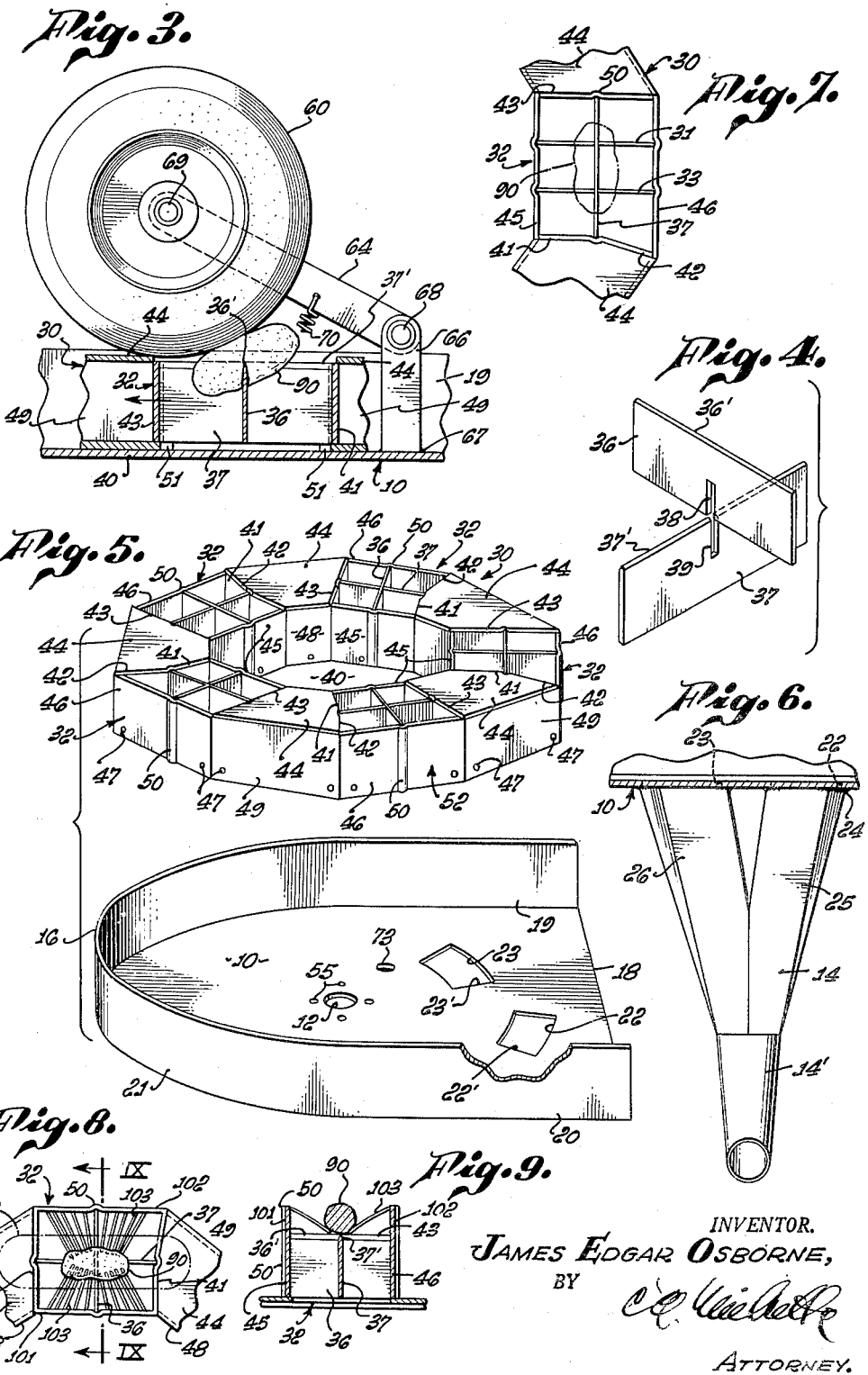

Patented June 23, 1953

2,642,909

UNITED STATES PATENT OFFICE 2,642,909

POTATO PLANTER

James Edgar Osborne, Tulelake, Calif.

Application July 3, 1950, Serial No. 171,887

5 Claims. (Cl. 146—57)

This invention relates generally to potato planters and more particularly discloses an apparatus for preparing seed potatoes for planting by the tuber unit method.

Planting potatoes according to the tuber unit method requires that all seed potatoes cut from any single potato be planted successively in a single row. It is sometimes desirable also to provide a slightly larger spacing between the group of seed potatoes from one potato and those seed potatoes planted in the same row cut from the preceding and succeeding potatoes.

Prior attempts to provide apparatus to plant seed potatoes by the tuber unit method have resulted in devices which are complex, expensive and unwieldy. This has especially been the case when such machinery is arranged to treat each seed potato, after being cut, with a disinfectant, fungicide or the like, as has become the practice in recent years to prevent rotting and to stimulate growth. Those familiar with this art are acquainted with the machinery presently available, such machinery including conveyors, and in many cases a reciprocating element for use during the cutting operation.

I have devised a novel and comparatively simple mechanism, suitable to be carried upon the usual farm trailer, whereby a potato may be cut into a desired number of seed potatoes, the seed potatoes may be treated with a desired disinfectant, and thereafter they may be planted at equally spaced intervals as the vehicle is towed along a row. Cutting the potatoes into seed form during planting is advantageous since the seed is not exposed to possible deterioration in storage, as is the case when precut sometime prior to planting. My invention includes means for centering each potato relative to the cutting knives, so that seed potatoes thus cut are of approximately uniform size. The cutting knives themselves are easily removable for inspection, repair or replacement, and no other parts of the device need be moved or adjusted in order to gain access to the knives. There are no reciprocating members requiring heavy bearings and framework.

It is an object of this invention, therefore, to provide an improved potato planter for tuber unit planting.

Another object of the invention is to provide a potato planter including means for treating each seed potato with disinfectant immediately before planting.

A further object of my invention is to provide an agricultural mechanism of the above character having few moving parts, including no reciprocating parts.

Another object is to disclose a potato planter including novel means for positioning each potato prior to being cut.

Still another object of my invention is to provide a potato planter having the above characteristics which is rugged and reliable in operation and comparatively economical to manufacture.

These and other and allied objects and purposes of my invention will become clear to those skilled in the art from a study of the following description of a preferred embodiment, taken in connection with the accompanying drawings in which:

Fig. 1 is a vertical sectional view of a potato planter incorporating my invention.

Fig. 2 is a plan view taken on line II—II of Fig. 1, with a portion of the base plate and cutting table broken away.

Fig. 3 is a fragmentary view, partially in section, taken on line III—III of Fig. 2.

Fig. 4 is an exploded view in perspective of a pair of knives used in my invention.

Fig. 5 is an exploded view in perspective of the base plate and cutting table.

Fig. 6 is an elevational view of the chute, taken on line VI—VI of Fig. 2.

Fig. 7 is a fragmentary view of an alternate form of cutting knife assembly.

Fig. 8 is a fragmentary plan view of a through-port including positioning means for centering a potato.

Fig. 9 is a sectional view taken on line IX—IX of Fig. 8.

Generally speaking, my invention includes a base plate 10 made of steel or the like and having a central aperture 12, a cutting table or wheel 30 above base plate 10 and provided with a plurality of through-ports or cutting boxes 32 and mounted upon a shaft 34 journalled in aperture 12, and a resilient pressure member 60 rotatably mounted above cutting table 30 and in frictional contact therewith. Potatoes placed upon cutting boxes 32 are each cut into a plurality of seed potatoes by pressure member 60 during rotation of cutting table 30, and continuing rotation of the table causes the seed potatoes formed from any individual potato to be fed into chute 14 at equally spaced intervals. In a preferred form of my invention I provide a disinfectant spray nozzle 62 adjacent pressure member 60 so that each seed potato is treated with disinfectant immediately after cutting and prior to planting.

In order to insure that each potato will be cut into seed potatoes of substantially equal size, I may modify the construction of the through-ports or cutting boxes as shown in Figs. 8 and 9. Means are thereby provided to center each potato, before being cut, relative to the cutting knives themselves. It is therefore not necessary for the operator to carefully center each potato on the cutting knives, and the planter may be efficiently used in connection with a supply hopper and automatic feeding mechanism if desired.

Referring now in detail to the drawings, and particularly to Fig. 1 thereof, base plate 10 is mounted in any suitable manner upon trailer 11, as by supporting structure indicated generally at 13. Preferably base plate 10 is inclined somewhat to the horizontal, as shown, for reasons which will hereinafter appear. Base plate 10 may assume a semi-circular contour 16 in its rear portion and is provided with a straight front edge 18 perpendicular to sides 19 and 20. An upstanding wall or flange 21 extends upwardly from the base plate 10 along sides 19 and 20 and semi-circular rear 16. No flange is needed along front edge 18 in the normal operation of my potato planter, although one may be provided if desired.

Centrally disposed in base plate 10 is a circular opening or aperture 12 through which passes shaft 34, whose axis is perpendicular to the plane of base plate 10. Radially spaced from central aperture 12 are two additional apertures or seed potato ports 22 and 23, each of said ports preferably having the shape of an annular portion of a sector. A chute 14 is attached to the lower surface of base plate 10 in any suitable manner as by weld 24, and communicates with ports 22 and 23. Chute 14 is arranged to conduct seed potatoes downwardly to a planting shoe 14' for depositing in a furrow in accordance with familiar practice. In order to minimize the possibility of clogging the chute during operation, the upper end of the chute is bifurcated and includes channels or passageways 25 and 26, communicating respectively with port 22 and port 23.

Means are provided for rotating shaft 34, said means including sprockets 15 and 56, chain 57 and gear box 52. Gear box 52 is provided with an upper flanged portion 53 secured to the lower surface of base plate 10 as by bolts 54 passing through holes 55 (see Fig. 5) in the base plate. During movement of trailer 11, the rotation of axle 17 and sprocket 15 fixed thereto is transmitted to sprocket 56 by means of chain 57. Sprocket 56 is fixed to input shaft 58 of gear box 52, and output shaft 34 receives power from input shaft 58 by conventioinal direction-changing means within gear box 52. Gear box 52 preferably includes a packing gland in which output shaft 34 is journalled for preventing disinfectant solution 72 from entering gear box 52. The internal construction of gear box 52 is not shown in detail, since such mechanisms are well known.

The upper end of shaft 34 is connected to cutting table 30 in any suitable manner, as by weld 35. Cutting table 30 includes a flat member 40 lying in a plane parallel to and adjacent the plane of base plate 10, and in the embodiment shown in the drawings, member 40 carries thereon five cutting boxes or through-ports 32. Each cutting box 32 is substantially rectangular in shape and includes inner side wall 45, outer side wall 46, and end walls 41 and 43. The outer portion 42 of end wall 41 may be bent slightly as shown so that portion 42 is substantially radial relative to cutting table 30. Flat member 40 does not extend under cutting boxes 32, the boxes having open tops and bottoms.

Each cutting box includes knives for cutting a potato into seed potatoes. In the embodiment shown in Figs. 2 and 5, there are two knives 36 and 37 in each box intersecting at right angles. Each of the knives 36 and 37 may have formed therein a transverse notch 38 and 39 respectively, by which the knives may be interengaged as shown in Fig. 4. The construction of Fig. 4 is illustrative only; any suitable means may be used for providing intersecting cutting members. The cutting edges 36' and 37' are directed upwardly. When inserted into a cutting box 32, the blades 36 and 37 are slidably received in vertically extending channels 50 formed centrally in side walls 45 and 46 and end walls 41 and 43 of each cutting box 32, and a lug or projection 51 (see Fig. 3) at the bottom end of channels 50 supports the blades in position with their cutting edges coplanar with the top of cutting boxes 32. One of the knives, as 36, is preferably radial with respect to cutting table 30, the other blade 37 being disposed tangentially relative to a circle passing through the centers of boxes 32. It will be evident that each cutting box 32 may be provided with more than two intersecting knives. As shown in the fragmentary view of Fig. 7, a central tangential blade 37 may be intersected by two blades 31 and 33.

The cutting boxes or through-ports 32 are equally spaced angularly on member 40, and in the embodiment herein illustrated and described each cutting box is angularly spaced by 72° from the adjacent cutting boxes. A flat plate 44 extends from the upper edge of one cutting box to the upper edge of each adjacent box, and is preferably welded thereto. In order to afford rigidity to cutting table 30, I may also provide vertical plates 48 and 49 extending between the inner and outer corners respectively of adjacent boxes. One or more small drain holes 47 are formed near the lower edges of plates 48 and 49 and side walls 45 and 46.

Projecting upwardly from base plate 10 is a supporting bracket 66 attached to base plate 10 as by weld 67. An arm 64 is pivotally attached at 68 to bracket 66, said arm 64 carrying at its outer end a shaft 69. A pressure member 60 is rotatably carried upon shaft 69 (see Figs. 1 and 3) in such a way that pressure member 60 is in frictional contact with the upper surface of cutting table 30. Member 60 is of resilient construction and may take the form of a solid wheel of rubber or the like or may be a pneumatic tire similar to an automotive tire. A spring 70 is attached at one end to arm 64 and at its other end to base plate 10, spring 70 serving the purpose of urging downwardly arm 64 and consequently pressure member 60.

It will now be understood that when a potato 90 has been placed upon the cutting edges of knives 36 and 37, the rotation of cutting table 30 (assumed to be counterclockwise in Fig. 2 as indicated by the arrow) will carry the potato 90 under the pressure member 60. The instant of contact between potato 90 and pressure member 60 is shown in Fig. 3, and it will be seen that upon continued movement of cutting table 30 in a leftward direction, potato 90 will be forced downwardly upon knives 36 and 37 and past the cutting edges thereof, thus forming four seed potatoes 91, 92, 93 and 94. Each of the seed potatoes 91, 92, 93 and 94, falls downwardly into the compartments or seed potato pockets formed within each cutting box 32 by the knives 36 and 37. Continued rotation of cutting table 30 carries the seed potatoes counter-clockwise, the seed potatoes sliding upon base plate 10 during such movement.

With special attention to Figs. 2 and 5, it can be seen that as the seed potatoes carried in their compartments approach the region of the base plate which includes ports or apertures 22 and 23, the seed potatoes will fall sequentially through the ports 22 and 23 and downwardly through channels 25 and 26 of chute 14. Specifically, seed potato 91 will first fall into port 22. Seed potato 92 will likewise fall into port 22 at a spaced interval following the fall of seed potato 91. Seed potato 93 will fall into port 23 at a spaced interval after the fall of seed potato 92, and seed potato 94 will fall into port 23 after the fall of seed potato 93.

According to the preferred method of tuber unit planting, the successive intervals between the falls of each of the seed potatoes should be substantially uniform, and this may be achieved with facility by my invention. The area of each through-port or cutting box 32 should be roughly the same as the area of plate 44 extending between adjacent cutting boxes. In addition, the proper angular displacement must be provided between the advance edges 22' and 23' of ports 22 and 23 respectively. When five cutting boxes are used, as in the illustrated embodiment of my invention, the angle A between said advance edges should be 36° or slightly less. When angle A is exactly 36°, successive seed potatoes will fall down chute 14 at substantially equal intervals of time. If it is desired to provide a slightly greater time interval between the planting of the last seed potato from any individual potato and the first seed potato of a succeeding whole potato, then angle A may be made somewhat less than 36° which will have the effect of decreasing slightly the interval between seed potatoes 92 and 93 and correspondingly increasing the spacing between the seed potatoes of successive whole potatoes. I have found that more nearly uniform timing of the mechanism is afforded by providing the bent or radial portion 42 previously described in the trailing end wall of the cutting boxes.

It is highly desirable to treat each seed potato with a liquid disinfectant immediately after the cutting of the seed potatoes and prior to planting thereof. In order to accomplish this I may provide a spray nozzle 62 adjacent pressure member 60 arranged to spray a disinfectant downwardly upon the seed potatoes just cut by the action of pressure member 60. Spray nozzle 62 is attached to the end of a liquid line 71 leading from pump 75 by which liquid under pressure may be supplied to spray nozzle 62. Pump 75 may be of any suitable type, such as a gear pump, and may conveniently be actuated by connection to gear box 52. Excess disinfectant collects in the bottom of the receptacle formed by the base plate and its flange 21, as indicated at 72. I preferably provide one or more drain holes 73 in base plate 10 connected to a drain line 74 for returning the excess liquid to the pump for recirculation. It will now be understood that the base plate 10 and cutting wheel 30 are preferably inclined upwardly to the front, in order to prevent excess disinfectant liquid 72 from discharging through ports 22 and 23. It will be likewise understood that the drain holes 47 previously referred to and described are provided in order to insure that cutting boxes 32 will not carry disinfectant liquid upwardly to ports 22 and 23 during rotation of the cutting wheel 30.

Means may be provided for positioning a potato relative to the cutting knives. A modification of the cutting boxes described hereinbefore is shown in Figs. 8 and 9, said modification including side wall extensions 101 and 102. The extensions are preferably formed integrally with their respective side walls 45 and 46 as shown, and along their upper edges they carry a number of inwardly projecting resilient fingers 103. Fingers 103 may be formed of rubber having the necessary strength, or resilient metal strips or wire may be used. Fingers 103 are disposed along the upper edges of extensions 101 and 102 in such a way that a potato placed upon them will be cradled above the center of the cutting box 32, as shown. It is desirable to provide a less resilient support at each end of the cutting box than in the central region in order that the potato's weight will tend to make it roll toward the center of the cradle formed by fingers 103, and thus accurately position it over the intersection of knives 36 and 37. For that reason, fingers 103 are spaced apart by a somewhat greater distance in the central region than at either end, and the fingers are preferably inclined toward the center as is clearly shown in Fig. 8.

When no potato is on the fingers they extend inwardly in a plane parallel to that of the cutting edges 36' and 37', but when a potato is placed on them, they flex downwardly as shown in Fig. 9. When pressure member 60 passes over the potato 90 and forces it downwardly onto knives 36 and 37, fingers 103 are forced downwardly and outwardly toward side walls 45 and 46. After the potato is cut, the fingers spring back into a plane parallel with the cutting edges 36' and 37'.

Thus a potato, whether fed by hand or by automatic feeding means, need not be placed upon the cutting box with great accuracy, since the fingers will properly position it for cutting. It will be evident that the distance between side wall extension 101 and 102 must be large enough to allow pressure member 60 to roll between them. The fingers must be short enough so that there is no possibility of their contacting cutting edge 37'. They will of course pass on either side of knife 36 during the cutting operation. Knives 36 and 37 may be inserted or removed without interference with fingers 103, the knives sliding in grooved channels 50 as described hereinbefore.

Thus it will be seen that I have provided a simple but efficient potato cutter and planter well adapted to be used in planting potatoes according to the tuber unit method. It will of course be understood that a cutting table may be used having more or fewer through-ports or cutting boxes than five, as have been herein described and illustrated. Furthermore, it will be readily seen that by varying the arcuate spacing of the ports or apertures formed in the base plate and the size of the cutting boxes, the user can conveniently arrange any desired spacing or interval between the seed potatoes cut from any one potato and between successive potatoes.

As mentioned hereinbefore, my invention may be used in conjunction with an automatic feeding mechanism if desired, although I contemplate using the equipment with hand feeding in order to make certain that each whole potato is placed upon the knives in such a way as to insure that each of the seed potatoes cut therefrom will be satisfactory. It is of course obvious that my invention may be used for cutting and planting other tuber plants.

Many modifications and changes from the specific forms of my invention shown and described hereinabove will occur to those skilled in the art. If no disinfectant is to be used, then the base plate and cutting table need not be tilted in the form shown. The pressure member may take the form of a wheel of solid resilient material, such as rubber or the like, rather than a pneumatic tire. The funnel or chute may be in the form of a hollow frustum of a cone, although I have found that there is less likelihood that the mechanism will become clogged when using the bifurcated chute heretofore described.

All modifications and changes within the spirit of the invention are intended to be embraced by the following claims.

I claim:

1. An apparatus for cutting and planting potatoes comprising: a centrally apertured base plate having two arcuately spaced seed potato ports formed therein, the inner edge of one port and the outer edge of the other port lying at substantially a common radius from the center of said base; a shaft extending through the central aperture of said base plate and journalled therein; a cutting table fixed to said shaft and rotatable therewith in a plane parallel to that of said base plate, said cutting table carrying a plurality of circumferentially disposed cutting boxes, each cutting box including a pair of mutually perpendicular knives forming four seed potato compartments, one of said knives being substantially tangential to a circle having said common radius; power means for rotating said shaft and wheel; pressure means carried by said base plate arranged to force a potato downwardly against said knives and past the cutting edges thereof; and a chute carried by said base plate and extending downwardly from the ports formed therein.

2. A machine for cutting and planting potatoes comprising: a centrally apertured base plate having two seed potato ports formed therein, each port including an advance edge radial relative to the center of the base plate, said radial advance edges being angularly spaced from each other by an angle substantially equal to but not more than 360°/2N, N being hereinafter defined, one side of the leading port lying on an arc of a circle concentric with said central aperture and having a radius R, which is hereinafter defined; a shaft extending upwardly through the central aperture of said base plate and journalled therein; a cutting table fixed to said shaft immediately above the base plate and provided with N equally spaced circumferentially disposed cutting boxes having open tops and bottoms; a pair of intersecting knives in each cutting box forming four seed potato pockets within each cutting box, one of the knives in each box being disposed tangentially relative to a circle concentric with said shaft and having a radius R; means for rotating said shaft; means carried by the base plate and disposed above said cutting wheel arranged to force a potato against said knives and past the cutting edges thereof; and a chute carried by said base plate communicating with said seed potato ports and extending downwardly therefrom.

3. A machine as stated in claim 2 including a plurality of elongated, inwardly directed resilient fingers positioned above said knives.

4. An apparatus for cutting potatoes into seed potatoes for planting comprising: a cutting table rotatable about an axis and provided with a plurality of angularly spaced circumferentially disposed cutting boxes having open tops and bottoms and having knives therein with upwardly directed cutting edges, said knives being tangential to a circle about said axis; a stationary base plate underlying said cutting table and having two discharge ports formed therein provided with arcuately spaced advance edges extending radially of said axis, said ports being portions of adjacent concentric annuli disposed inwardly and outwardly of said circle; means for rotating said cutting table; and pressure means arranged to force a potato downwardly on the knife in a cutting box and past the cutting edge thereof.

5. An apparatus for cutting potatoes into seed potatoes for planting comprising: a cutting table rotatable about an axis and provided with a plurality of angularly spaced circumferentially disposed cutting boxes having open tops and bottoms and having knives therein with upwardly directed cutting edges, said knives being tangential to a circle about said axis; a stationary base plate underlying said cutting table and provided with two discharge ports formed therein disposed one inwardly and one outwardly of said circle and having advance edges spaced arcuately of the circle; means for rotating said cutting table; and pressure means arranged to force a potato downwardly on the knife in a cutting box and past the cutting edge thereof.

JAMES EDGAR OSBORNE.

References Cited in the file of this patent

UNITED STATES PATENTS

| Number | Name | Date |
|---|---|---|
| 343,984 | Canedy | June 22, 1886 |
| 957,118 | Snyder | May 3, 1910 |
| 1,243,538 | Mattern | Oct. 16, 1917 |
| 1,274,042 | Holt | July 30, 1918 |
| 1,297,373 | Luther | Mar. 18, 1919 |
| 1,420,843 | Israelson | June 27, 1922 |
| 1,887,239 | Hansen | Nov. 8, 1932 |
| 2,226,071 | Oldenburg | Dec. 24, 1940 |
| 2,271,957 | Saiberlich | Feb. 3, 1942 |
| 2,291,930 | Thompson | Aug. 4, 1942 |
| 2,342,122 | Cook | Feb. 22, 1944 |
| 2,401,931 | Hawkins | June 11, 1946 |